United States Patent
Kanbe et al.

(10) Patent No.: US 10,753,333 B2
(45) Date of Patent: Aug. 25, 2020

(54) VEHICLE CONTROL SYSTEM

(71) Applicant: HONDA MOTOR CO., LTD., Tokyo (JP)

(72) Inventors: Katsuhito Kanbe, Wako (JP); Eisuke Horii, Wako (JP); Katsuya Matsuzaki, Wako (JP); Yuki Hotani, Wako (JP); Keishiro Kikuchi, Wako (JP); Hisanori Yanagida, Wako (JP); Toshihiko Fukuda, Wako (JP); Hideharu Murano, Wako (JP); Shinji Suto, Wako (JP); Ikuo Nonaga, Wako (JP); Hiroyuki Hase, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/469,777

(22) PCT Filed: Dec. 12, 2017

(86) PCT No.: PCT/JP2017/044567
§ 371 (c)(1),
(2) Date: Jun. 14, 2019

(87) PCT Pub. No.: WO2018/110549
PCT Pub. Date: Jun. 21, 2018

(65) Prior Publication Data
US 2020/0095968 A1      Mar. 26, 2020

(30) Foreign Application Priority Data
Dec. 15, 2016   (JP) ................. 2016-243823

(51) Int. Cl.
*B60T 13/74* (2006.01)
*B60T 7/12* (2006.01)
*F02N 11/08* (2006.01)

(52) U.S. Cl.
CPC ............... *F02N 11/08* (2013.01); *B60T 7/12* (2013.01); *B60T 13/74* (2013.01);
(Continued)

(58) Field of Classification Search
CPC .... B60T 13/74; B60T 7/12; F02N 2200/0803; F02N 2200/102
See application file for complete search history.

(56) References Cited

U.S. PATENT DOCUMENTS

2016/0290264 A1* 10/2016 Oda ..................... F02N 11/0818
2016/0297415 A1* 10/2016 Kato ................... B60W 10/184
2017/0113693 A1*  4/2017 Bularz ............ B60W 30/18027

FOREIGN PATENT DOCUMENTS

JP        3104254 U      9/2004
JP     2005-297777 A    10/2005
(Continued)

OTHER PUBLICATIONS

International Search Report by ISA/JP dated Mar. 6, 2018, on PCT/JP2017/044567 (2 pages).
(Continued)

*Primary Examiner* — Tisha D Lewis
(74) *Attorney, Agent, or Firm* — Rankin, Hill & Clark LLP

(57) ABSTRACT

A vehicle control system includes a boost device, a braking unit, a cell motor, and a start operating unit. The boost device boosts a braking force applied by a foot brake to a vehicle with an output voltage from a battery. The braking unit, which is different than the foot brake, brakes the vehicle appropriately and keeps the braking force even in a case that the output voltage is not supplied from the battery, or which braking unit does not require the output voltage from the battery. The cell motor is driven by an output voltage from the battery and starts the engine. The start operation unit
(Continued)

starts the cell motor, wherein the vehicle control system has a function not to start the cell motor when the start operation unit is operated, unless the braking unit is in operation.

2 Claims, 4 Drawing Sheets

(52) U.S. Cl.
CPC ... *B60T 2260/08* (2013.01); *F02N 2200/0802* (2013.01); *F02N 2200/0803* (2013.01); *F02N 2200/102* (2013.01)

(56) References Cited

FOREIGN PATENT DOCUMENTS

| | | |
|---|---|---|
| JP | 2008-057464 A | 3/2008 |
| JP | 2008-298016 A | 12/2008 |
| JP | 2012-035773 A | 2/2012 |
| JP | 2013-100732 A | 5/2013 |

OTHER PUBLICATIONS

Written Opinion by ISA/JP dated Mar. 6, 2018, on PCT/JP2017/044567 (5 pages).

\* cited by examiner

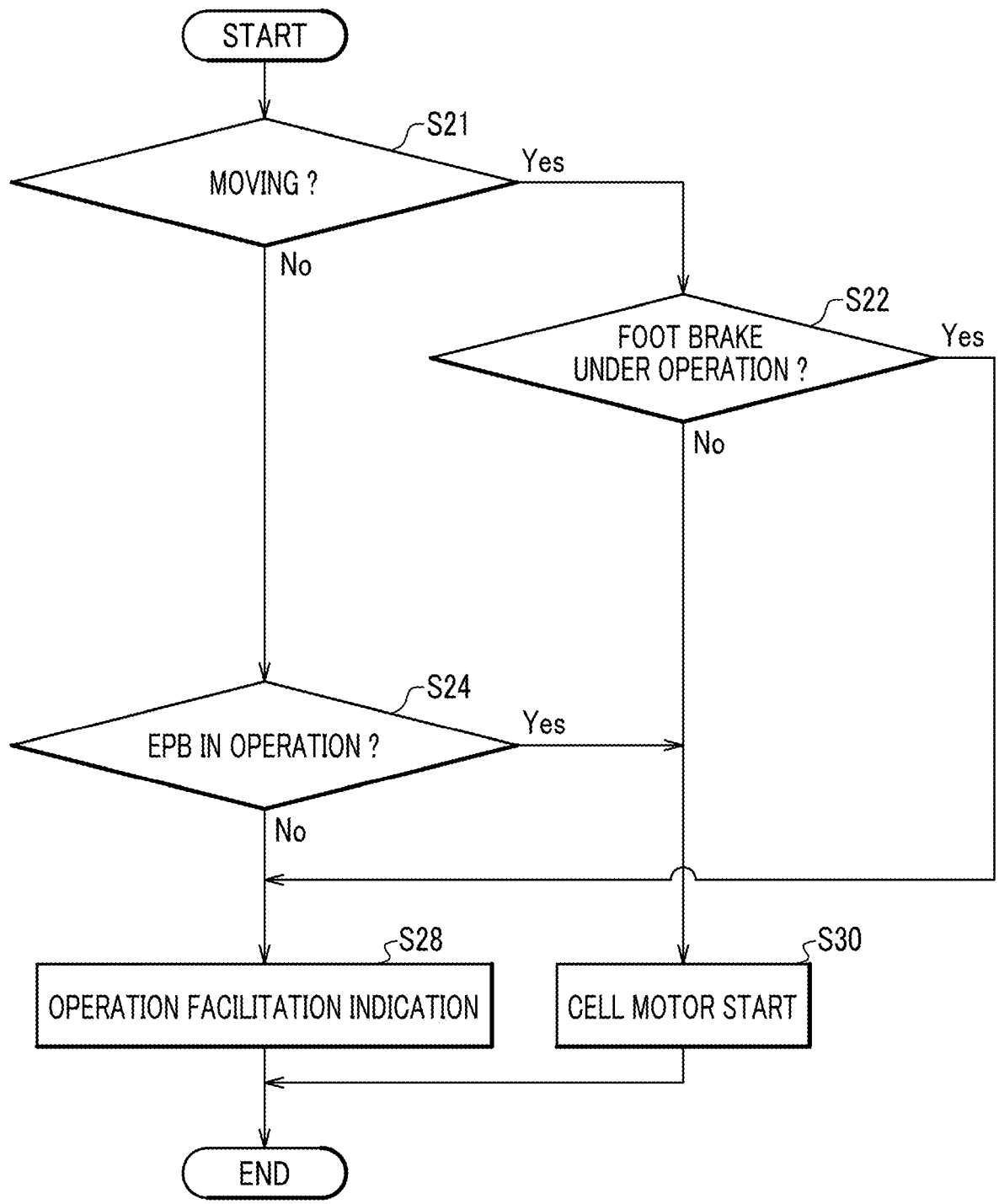

VEHICLE CONTROL SYSTEM

TECHNICAL FIELD

The present invention relates to a vehicle control system.

BACKGROUND ART

As background art of the present technical field, in a patent literature cited below, it is described that, in case that a breaking force of a hydraulic brake is insufficient for the breaking power required by a driver, when a electric parking brake is in a working state, the release of the electric parking brake is inhibited, and when it is not in a working state, it will be set to a working state.

CITATION LIST

Patent Literature

Patent Literature 1: Japanese open-laid patent application No. 2005-297777A

SUMMARY OF INVENTION

Technical Problem

Now, some of the recent vehicles are equipped with an EBB (electric brake booster) which performs a control of a booster of braking force with an electrical power. As far as the EBB is working normally, a pressing force by the driver against a foot brake pedal is boosted, and therefore a stopped state of a vehicle can be easily kept even on a slope and the like. However, when, on a slope and the like, the engine is stopped and the shift-lever is set to N-range while the vehicle is kept stopped, the foot brake pedal is pressed, and the engine is then started in a state that the parking brake is released, there may occasionally occur a trouble.

Namely, when the engine is started, if a battery voltage is decreased below a reset voltage of an ECU due to operation of a cell motor, the EBB may occasionally stop its operation. As a result, when the braking force is insufficient, the vehicle slowly goes down the slope and the like, against the intention of the driver. Further, when the EBB is in operation, the driver can press down deeply the foot brake pedal with a less press-down force. In that state, when the operation of the EBB is stopped, a kickback from the foot brake pedal to the driver's foot occurs, which may make the driver uncomfortable.

Thus, it can be also conceived that the EPB (electric parking brake) is automatically operated in the stopped state of the engine and the vehicle. However, if the EPB is operated automatically, it is difficult by a human power to move other vehicle which is parked blocking the driver's vehicle to come out from a parking place. Further, when the engine is started next time, such operations as manual releasing of the EPB, setting a seatbelt to on, and the like, become necessary, which result in more complex operations.

The present invention is created considering the above matters and aims at providing a vehicle control system which can prevent an unintentional behavior of the vehicle for the driver when the vehicle is started.

Solution to Problem

A vehicle control system according the present invention for solving the above problem is a vehicle control system applied to a vehicle comprising: a boost device by which a braking force applied by a foot brake to a vehicle is boosted with an output voltage from a battery, a braking unit other than the foot brake, which braking unit brakes the vehicle appropriately and keeps the braking force even in a case that the output voltage is not supplied from the battery, or which braking unit does not require the output voltage from the battery, a cell motor which is driven by an output voltage from the battery and starts the engine, and a start operation unit which instructs the cell motor to start, wherein the vehicle control system has a function to start the cell motor when the start operation unit is operated, on the condition that the braking unit is in operation.

Advantageous Effect of the Invention

According to the vehicle control system of the present invention, an unintentional behavior of the vehicle for the driver can be prevented when the vehicle is started.

BRIEF DESCRIPTION OF DRAWINGS

FIG. 4 shows a flow-chart of a start control routine carried out in the engine control unit according to a second embodiment.

DESCRIPTION OF EMBODIMENTS

First Embodiment

<Configuration of a First Embodiment>

In the following, regarding a first embodiment of the present invention is explained in detail referring to the figures accordingly.

Figure 1:
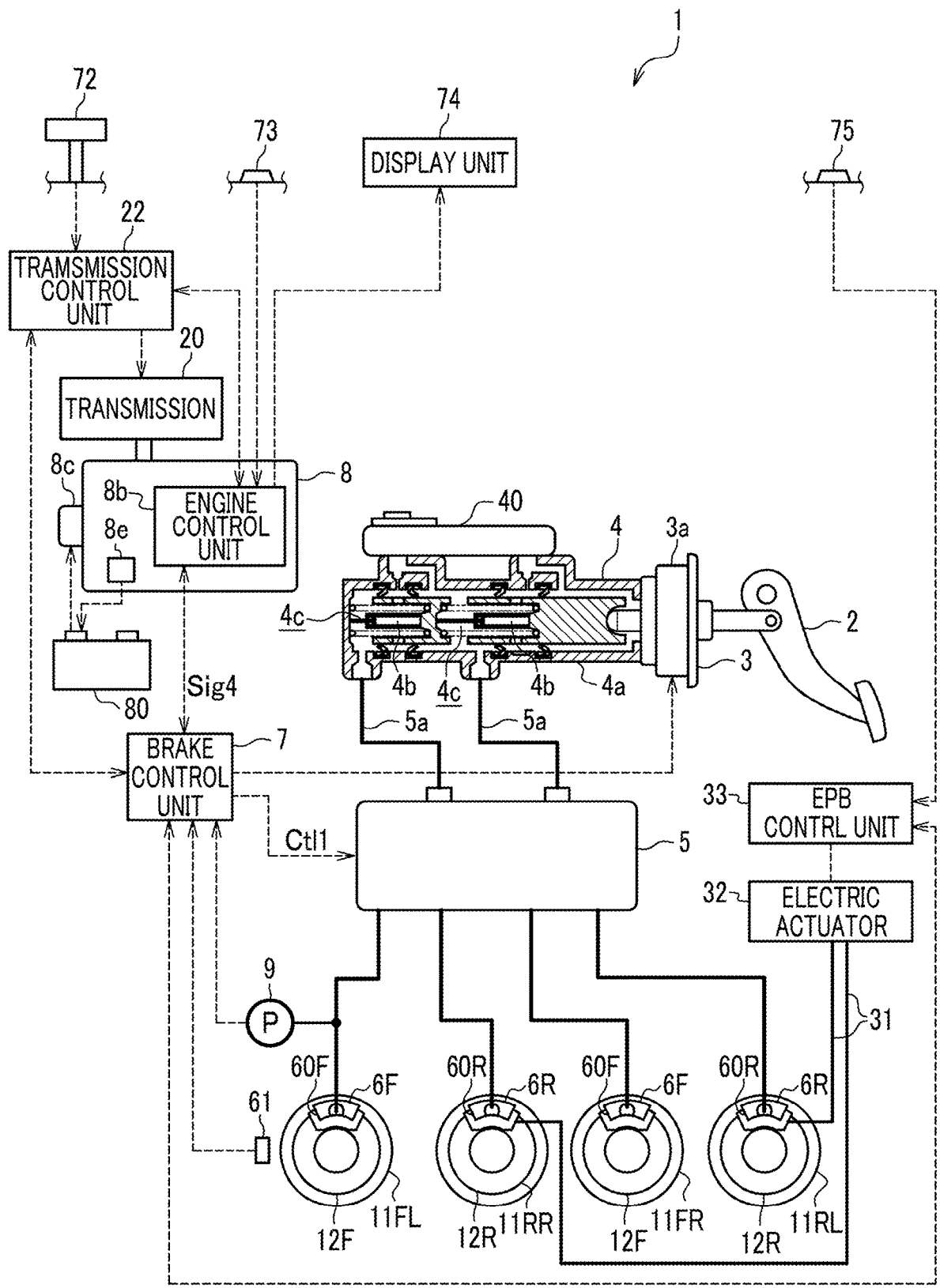
FIG. 1 shows a block diagram of a vehicle according to a first embodiment of the present invention.

FIG. 1 is a block diagram of a vehicle according to the first embodiment of the present invention. As shown in FIG. 1, a vehicle 1 of the present embodiment comprises a foot brake pedal 2 (foot brake), an electric brake booster 3 (boost device), a master cylinder 4, a vehicle-stabilizing device 5, a pair of right-left front brake operation unit 6F, a pair of right-left rear brake operation unit 6R, a brake control unit 7, an engine 8. The foot brake pedal 2 is a brake operation unit operated by a driver (press-down operation). It should be noted that the vehicle 1 in the present embodiment is a vehicle equipped with an automatic transmission, namely it is a vehicle in which an automatic transmission or a belt-type continuously variable transmission is installed.

The brake booster 3 is a force-amplifying unit which amplifies (boosts) an operation force (press-down operation force) that the driver applies to the foot brake pedal 2 in a press-down operation and assists the driver in the press-down operation of the foot brake pedal 2. The brake booster 3 has an electric motor to which power is supplied from a battery 80 of 12V. Namely, since the brake booster 3 is operated when a supply voltage of a predetermined range is supplied from the battery 80 and its operation stops when the supply voltage deviates from the predetermined range, it becomes no longer possible to assist the press-down operation of the foot brake pedal 2. Further, due to decrease of the voltage of the battery 80, it becomes no longer possible that the brake booster 3 assists the press-down operation.

The master cylinder 4 generates a hydraulic pressure in the hydraulic oil according to an operation amount of the press-down operation applied to the foot brake pedal 2 by the driver. The master cylinder 4 accommodates a piston 4b within a cylindrical main body 4a. The piston 4b slides within the main body 4a, pressing the hydraulic oil within the main body 4a to generate a hydraulic pressure. During operation of the brake booster 3, when the driver applies a press-down operation to the foot brake pedal 2, then the force of the press-down operation at that time is force-amplified by the brake booster 3, and thus the piston 4b of the master cylinder 4 is operated by the force-amplified press-down operation force to generate a hydraulic force in the hydraulic oil.

In the master cylinder 4, two pistons 4b are arranged in series. The interior of the main body 4a is divided by the two pistons 4b into two hydraulic oil chambers 4c, wherein it is so configured that a hydraulic pressure is generated in each of the two hydraulic chambers 4c. The hydraulic pressures generated in the two hydraulic chambers 4c are transmitted to a vehicle-stabilizing device 5 via two pipes 5a which are connected to the respective hydraulic chambers 4c. Further, the master cylinder 4 is provided with a reservoir tank 40. The reservoir tank 40 stores the hydraulic oil. The reservoir tank 40 is communicated with the two hydraulic chambers 4c which are formed within the master cylinder 4.

The vehicle-stabilizing device 5 supplies the hydraulic pressure inputted via the pipes 5a to the front brake operation unit 6F via a front pipe and to the rear brake operation unit 6R via a rear pipe. Further, the vehicle-stabilizing device 5 generates a hydraulic pressure to be transmitted to the front brake operation unit 6F and to the rear brake operation unit 6R, according to an instruction inputted from the brake control unit 7 (hydraulic pressure generation instruction Ctl1). In this manner, the brake control unit 7 controls the vehicle-stabilizing device 5 to generate a hydraulic pressure in the hydraulic oil. A hydraulic pressure gauge 9 measures a hydraulic pressure in the front pipe and inputs a measurement signal thereof to the brake control unit 7. The brake control unit 7 determines whether the foot brake pedal 2 is in operation or not, based on the measurement signal. Further, at least one wheel of the respective wheels is provided with a rotational speed sensor 61 which detects a rotational speed thereof. The brake control unit 7 determines whether the vehicle 1 is moving or not, based on a rotational speed outputted from the rotational sensor 61. Though a detailed explanation about the vehicle-stabilizing device 5 is omitted, it should be noted that a vehicle stabilizing unit as described for example in a Japanese open-patent application no. 2016-203906A can be applied as a vehicle-stabilizing device 5 for the present embodiment.

A front brake operation unit 6F is provided to each of the front wheels of the vehicle 1 (front-left wheel 11FL and front-right wheel 11FR), generating a braking force to brake the front-left wheel 11FL and the front-right wheel 11FR. And, a rear brake operation unit 6R is provided to each of the rear wheels of the vehicle 1 (rear-right wheel 11RR and rear-left wheel 11RL), generating a braking force to brake the rear-right wheel 11RR and the rear-left wheel 11RL. The front brake operation units 6F respectively have, for example, a caliper (front wheel caliper 60F) which generates a braking force by sandwiching a rotating disc (front wheel disc 12F) which rotates together with the front-left wheel 11FL and the front-right wheel 11FR. Similarly, the rear brake operation units 6F respectively have, for example, a caliper (rear wheel caliper 60R) which generates a braking force by sandwiching a rotating disc (rear wheel disc 12F) which rotates together with the rear-right wheel 11RR and the rear-left wheel 11RL.

The engine 8 is provided with an engine control device 8b (vehicle control system) and a cell motor 8c. Here, the engine control device 8b comprises a hardware configuration as a standard computer, such as a CPU (Central Processing Unit), a RAM (Random Access Memory), a ROM (Read Only Memory), and the like, wherein various control programs are stored in the ROM. When a start switch 73 (start operation unit) is operated to be turned on, then a start control routine (refer to FIG. 2) is initiated, as described later. In this routine, when a certain condition is satisfied, the engine control device 8b supplies an electrical power stored in the battery 80 to the cell motor 8c. The cell motor 8c is then driven by the electrical power supplied from the battery 80 and starts the engine 8.

Further, the engine 8 is provided with a generator device 8e such as an alternator. The generator 8e generates an electrical power while the engine 8 is in operation. The electrical power generated by the generator 8e (generated electrical power) is stored in the battery 80. Further, the engine control device 8b detects a rotational speed of the engine 8, and inputs a detected signal thereof (rotational speed signal Sig4) to the brake control unit 7. The brake control unit 7 acquires a rotational speed of the engine 8 by use of the rotational speed signal Sig4. Further, the brake control unit 7 supplies information on whether the foot brake pedal 2 is under operation or not, to the engine control device 8b.

Now, when the cell motor 8c is started, a high current flows from the battery 80 to the cell motor 8c. Due to this, when the stored electrical power of small, or when the battery 80 is deteriorated, the output voltage from the battery 80 decreases largely when the cell motor 8c is started. Thereby, the brake control unit 7 can occasionally be reset, resulting in a stop of the brake booster 3. Therefore, when the driver stops the vehicle on a slope and the like only using the braking force of the foot brake pedal 2 and the brake booster 3, and in that state if the cell motor 8c is started, the braking force decreases to be insufficient due to ceasing of the brake booster 3, and the vehicle may occasionally slowly go down the slope and the like, against the intention of the driver.

Further, since the boosting will be lost when the brake booster 3 is stopped due to a decrease of the output voltage from the battery 80, a kickback from the foot brake pedal to the driver's foot occurs, which may make the driver uncomfortable.

The vehicle 1 comprises, for a parking brake, an EPB (electric parking brake) switch 75, an EPB control unit 33 (braking unit), and an electric actuator 32 (braking unit). The electric actuator 32 is connected to the respective rear brake operation units 6R with a wire 31, which units are provided respectively for example to the rear wheels (rear-right wheel 11RR, rear-left wheel 11RL). The EPB control unit 33 drives the electric actuator 32 and rewinds the wires 31, when a turn-on operation of the EPB switch 75 (braking unit) by the driver is detected.

Thereby, the rear brake operation units 6R are actuated to lock the rear wheels (rear-right wheel 11RR, rear-left wheel 11RL), by which the vehicle 1 is kept in a stationary state. Namely, the operation of the parking brake is completed.

Further, the EPB operation unit 33 drives the electric actuator 32 and releases the wires 31, when a turn-off operation of the EPB switch 75 by the driver is detected. The EPB control unit 33 reports to the engine control device 8b via the brake control unit 7, whether the parking brake is in operation or not. It should be noted that the parking brake, here, is for keeping the braking force even in a case that an output voltage is not supplied from the battery 80.

Further, the vehicle 1 comprises a shift lever 72 (braking unit), a display unit 74, a transmission control unit 22 (braking unit), and a transmission 20 (braking unit). The transmission 20 transmit a torque from the engine 8 to each wheel. The shift lever 72 is operated by the driver to select any range among a plurality of ranges. The plurality of ranges includes at least P-range (parking range), R-range (reverse range), N-range (neutral range), and D-range (drive range).

Here, the P-range is a range used for parking. In the P-range, a driving shaft is fixed within the transmission 20, and therefore the driving wheels (for example, front-left wheel 11FL and front-right wheel 11FR) are no more rotated, thus the vehicle 1 is to be braked. It should be noted, though it is needless to say, that after selection of the P-range, the P-range is maintained even when the power supply from the battery is ceased. And, the R-range is a range for driving each wheel to the backward direction. And, the D-range is a range for driving each wheel to the forward direction. And, the N-range is a range for a purpose that a torque will not be transmitted from the engine 8 to each wheel. In the R- or D-range, starting of the engine 8 is not permitted, and in the P- or N-range, starting of the engine 8 is permitted when various conditions are satisfied.

The transmission control unit 22 controls the transmission 20 so as to achieve a range selected by the shift lever 72. Further, the transmission control unit 22 reports the range selected by the shift lever 72 to the engine control device 8b. Further, the engine control device 8b instructs the display unit 74 to display various messages and the like for the driver. It should be noted that the display unit 74 is a MID (Multi Information Display) employing an indicator, a liquid crystal display, and so on.

<Operation of First Embodiment>

Figure 2:
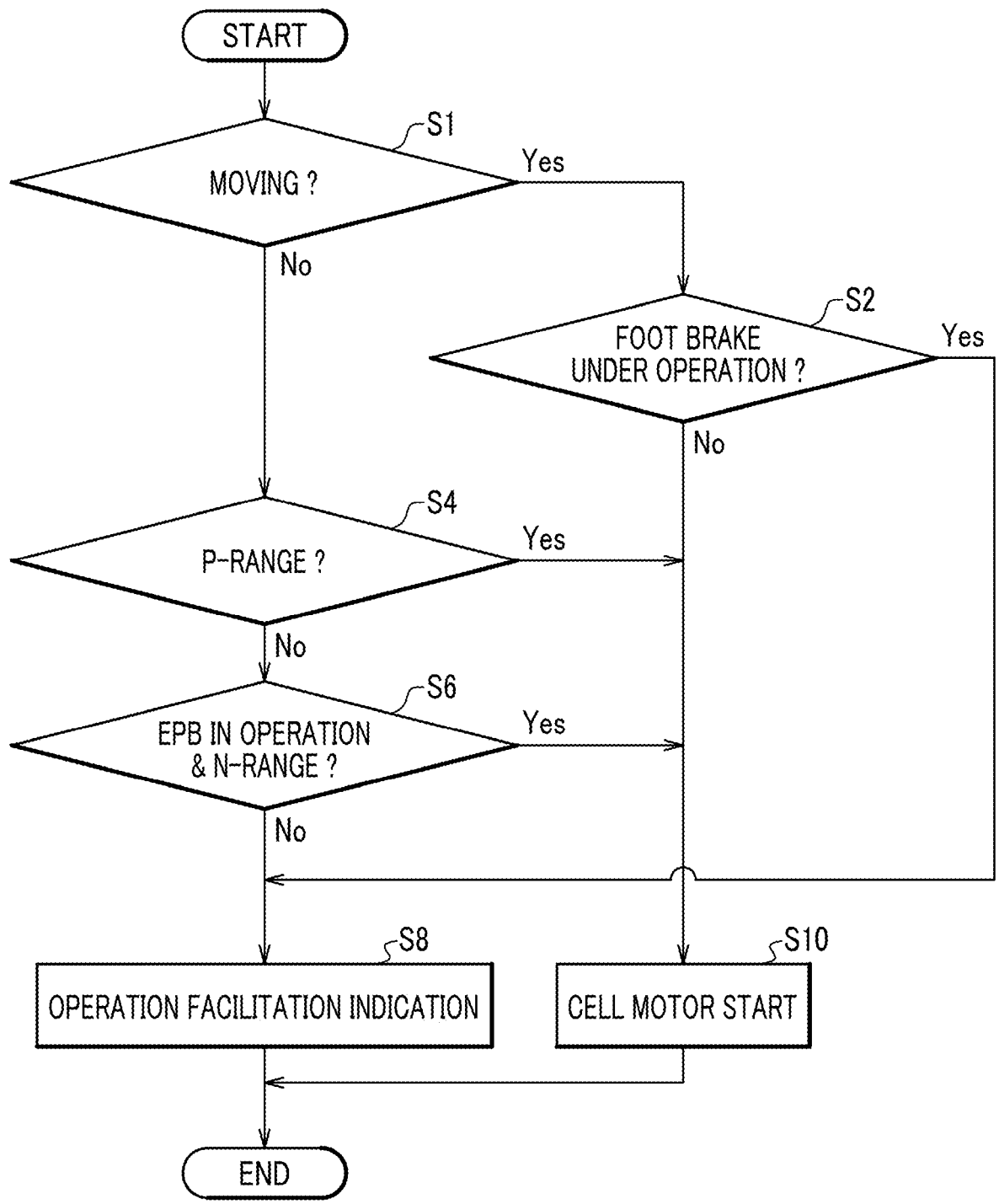
FIG. 2 shows a flow-chart for a start control routine carried out in an engine control unit according to the first embodiment.

FIG. 2 is a flow-chart for a start control routine carried out by an engine control unit 8b when the start switch 73 is operated to be turned on.

In FIG. 2, when the process proceeds to step 1 by operating the start switch 73 to turn on, the engine control device 8b determines whether the vehicle 1 is moving or not, based on a signal from the brake control unit 7. If step 1 results in is "Yes", then the process proceeds to step S2, and the engine control device 8b determines whether the foot brake pedal 2 is under operation or not, namely whether it is pressed down by the driver or not, based on a signal from the brake control unit 7.

If step 1 results in "No", the process proceeds to step S10, and the engine control device 8b starts the cell motor 8c, by which the engine 8 is started. Namely, in the present embodiment, when the foot brake pedal 2 is not operated while the vehicle is moving, starting of the engine 8 is permitted irrespective of the positions of the parking brake and the shift lever. The purpose of this is for enabling a restart of the engine 8 while the vehicle continues moving in a case that the engine 8 is stopped due to any reason during the moving. Further, when the foot brake pedal is not operated and the voltage of the battery 80 is decreased, the vehicle 1 can prevent from slow going down, and also the driver can prevent from suffering the kickback.

Figure 3A:
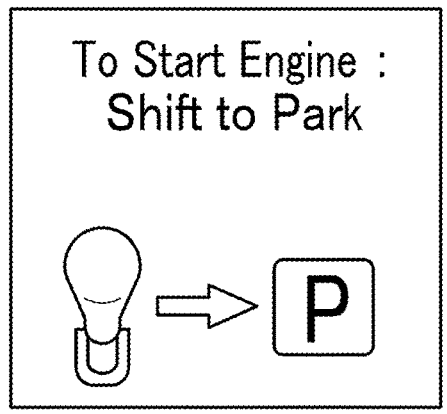
FIG. 3A shows a display example of an operation facilitation indication on a display unit.
Figure 3B:
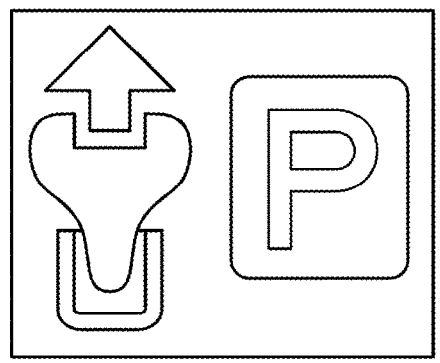
FIG. 3B shows another display example of an operation facilitation indication on a display unit.

On the other hand, if step S2 results in "Yes", the process proceeds to step S8, and the engine control device 8b displays a predetermined operation facilitation indication. This operation facilitation indication is for encouraging the driver to shift the shift lever 72 to the P-range. When the display unit 74 comprises a dot-matrix display such as MID, preferably an image such as shown in FIG. 3A can be displayed, for example. Further, it may be also acceptable to provide a part of the display unit 74 with a transparent plate to be projected with a figure as shown in FIG. 3B, and to illuminate the plate from its backside with a back light. Besides, about FIG. 3C, it will be explained later.

Further, when the vehicle 1 is stopped, it will be determined "No" in step 1, and the process proceeds to step 4. In step S4, the engine control device 8b determines whether the P-range is selected by the shift lever 72, based on the reported range from the transmission control unit 22.

If step 4 results ins "No", the process proceeds to step S6. In step S6, the engine control device 8b determines whether the both two conditions, "the EPB (electric parking brake) is in operation" and "the N-range is selected by the shift lever 72", are satisfied, based on a information supplied from the EPB control unit 33 via the brake control unit 7.

If any of the above explained steps S4 and S6 results in "Yes", the process proceeds to step S10, and, as explained above, the engine control device 8b starts the cell motor 8c and the engine 8. The reason why the process proceeds to step S10 in this case is that the braking force of the parking brake and the lock-status of the driving wheels in the P-range are not affected by the output voltage from the battery 80, and such a behavior of the vehicle, as the vehicle 1 going down slowly on a slope, can hardly occur, against the intention of the driver.

On the other hand, if both steps S4 and S6 result in "No", the process proceeds to step S8, and, as explained above, the engine control device 8b displays a predetermined operation facilitation indication in the display unit 7.

If the driver, looking at the operation facilitation indication, sets the shift lever 72 to the P-range when the vehicle 1 is kept stopped, subsequently start on the start switch 73 again, then the start control routine (refer to FIG. 2) is again initiated. In this case, the process proceeds in the order, "START"→"No" in S1→"No" in S4→"Yes" in S6, and then proceeds to step S10, thereby the cell motor 8c and the engine 8 are started. Thus, the process of the present routine is completed, as explained above.

<Effect of First Embodiment>

As explained above, according to the present embodiment, the vehicle control system (7, 8b) has a function to start the cell motor (8c) when the start operation unit (73) is operated, on the condition that the braking units (20, 22, 32, 33, 72, 75) are in operation. Thereby, the trouble such that the braking force is decreased and thus the vehicle 1 goes down slowly on a slope and the like against the intention of the driver can be prevented.

In addition, according to the present embodiment, since the driver is encouraged to set the shift lever 72 to the P-range looking at an indication in the display unit 74, namely the indicator or the MID, the possibility that the driver sets the shift lever 72 to the P-range and also lifts his foot off the foot brake pedal 2 becomes higher. Thereby, due to a change in boosting of the brake booster 3, the possibility of occurrence of a kickback from the foot brake pedal 2 to the driver can be reduced.

In addition, the vehicle control system (7, 8b) according to the present embodiment starts the cell motor (8c), when the foot brake pedal (2) is not in operation while the vehicle is moving and if the start operation unit (73) is operated, irrespective of whether the braking units (20, 22, 32, 33, 72, 75) are in operation or not, by which the cell motor (8c) can be started while the vehicle is moving.

Second Embodiment

Next, it will be explained about a vehicle according to a second embodiment of the present invention.

The vehicle related to the second embodiment is a vehicle of a manual transmission type. Though the illustration about the configuration of the vehicle according to the present embodiment is omitted, it is in general similar to that of the first embodiment shown in FIG. 1. However, the shift lever 72 is a shift lever for a manual transmission, and thus no shift position corresponding to the P-range of an automatic transmission exists. Further, in the present embodiment, the transmission control unit 22 is not provided, and the shift lever 72 and the transmission 20 are in mechanically direct coupling. The configuration of the present embodiment is similar to that of the first embodiment (refer to FIG. 1) other than those explained here for the present embodiment.

FIG. 4 is a flow-chart of a start control routine in the present embodiment, which routine is carried out in the engine control unit 8b when the start switch 73 is operated to be turned on.

In FIG. 4, when the process proceeds to step S21, the engine control device 8b determines whether the vehicle 1 is moving or not, based on a signal from the brake control unit 7. If step S21 results in "Yes", then the process proceeds to step S22, and the engine control device 8b determines whether the foot brake pedal 2 is under operation or not, namely whether the pedal 2 is pressed down by the driver or not, based on a signal from the brake control unit 7.

If step S22 results in "No", the process proceeds to step S30, and the engine control device 8b starts the cell motor 8c, by which the engine 8 is started. In this manner, also in the present embodiment similarly to the first embodiment, when the foot brake pedal 2 is not operated while the vehicle is moving, starting of the engine 8 is permitted irrespective of the state of the parking brake.

Figure 3C:
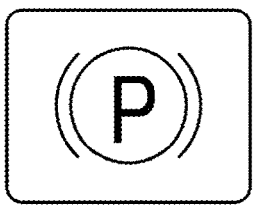
FIG. 3C shows still another display example of an operation facilitation indication on a display unit.

On the other hand, if step S22 results in "Yes", the process proceeds to step S28, and the engine control device 8b displays a predetermined operation facilitation indication. The operation facilitation indication of the present embodiment is for encouraging the driver to operate the EPB switch 75. When the display unit 74 comprises a dot-matrix display, preferably an image such as shown in FIG. 3C can be displayed, for example.

Further, when the vehicle 1 is stopped, step S21 will result in "No", and the process proceeds to step S24. In step S24, the engine control device 8b determines whether the EPB (electric parking brake) is in operation or not, based on the supplied information from the EPB control unit 33 via the brake control unit 7.

If the step S24 results in "Yes", the process proceeds to S30, and, as explained above, the engine control device 8b starts the cell motor 8c and the engine 8.

On the other hand, if step S24 results in "No", the process proceeds to step S28. In step 28, as explained above, the engine control device 8b displays an operation facilitation indication in the display unit 74. Therewith, the process of the present routine is completed.

As explained above, according to the present embodiment, analogous to the first embodiment, the vehicle control system (7, 8b) has a function to start the cell motor (8c) when the start operation unit (73) is operated, on the condition that the braking units (32, 33, 75) are in operation. Thereby, the trouble such that the braking force is decreased and thus the vehicle 1 goes down slowly on a slope and the like against the intention of the driver can be prevented.

[Variations]

The present invention is not limited to the above described embodiments, but also enables further various variations. The above explained embodiments are for the purpose of easier understanding of the present invention, and therefore the present invention is not limited to those which have all configurations as explained above. Further, it is possible to add other configurations to the configurations of the above embodiments, and it is also possible to replace a part of the configurations of the above embodiments with other configurations. Further, the control lines and the information lines shown in the figures are those which are necessary for explanation, and they may not necessarily represent all required control lines and information lines for a product. Practically, it can be considered that almost all configurations are interconnected. As possible variations to the above embodiments, the followings can be presented, for example.

(1) Since the hardware of the engine control device 8b in the above embodiments can be realized with a standard computer, a program according to FIG. 2 can be stored in a memory medium and can be distributed via a transmission line.

(2) Though the process shown in FIG. 2 has been explained in the above embodiments as a software process by use of a program, a portion or the whole thereof can be replaced with a process on a hardware by use of an ASIC (Application Specific Integrated Circuit), or a FPGA (field-programmable gate array).

(3) Though, in the above embodiments, the EPB switch 75, the EPB control unit 33, and the electric actuator 32 are applied for a parking brake device, also a parking brake which intrinsically does not require an electrical power supply from the battery 80 can be applied. For example, a parking brake lever (unshown), in which a wire 31 is operated with a force of a driver's arm, can also be applied, or a parking brake pedal (unshown), in which a wire 31 is operated with a step-in action of a driver's foot, can also be applied. Further, in the above embodiments, an ignition key can be applied replacing the start switch 73.

(4) Though, in the above embodiments, the rear brake operation units 6R are operated by the parking brake device (32, 33, 75), also it can be so arranged that the front brake operation units 6F are operated.

(5) In the first embodiment, while the vehicle is moving, the cell motor 8c is enabled to start irrespective of the states of the parking brake and the shift lever 72, unless the foot brake pedal 2 is under operation (in step S2 "No"→step S10). However, when it will be not be considered about restarting of the engine 8 while the vehicle is moving, it can be so arranged to provide the operation facilitation indication, as far as the result is not "Yes" in any of steps S4 and S6, irrespective of the state of the foot brake pedal 2.

(6) Though the operation facilitation indication of step S8 in the first embodiment is to encourage the driver to apply an operation to set the shift lever 7 to the P-range, it can be so arranged to encourage driver to apply the operation of the EPB switch 75, analogous to step 28 of the second embodiment (for example, as shown in FIG. 3C). However, since, after the EPB switch 75 is operated to be turned on, it needs some time until the parking brake arrives at the state of operation, it is preferable in a vehicle of automatic transmission type to encourage the driver to apply the operation of the shift lever 72 having a quick response.

REFERENCE SIGNS LIST

- 1 vehicle
- 2 foot brake pedal (foot brake)
- 3 brake booster (boost device)
- 7 brake control unit (vehicle control system)
- 8 engine
- 8*b* engine control device (vehicle control system)
- 8*c* cell motor
- 11FL, 11RR, 11FR, 11RL wheels
- 20 transmission (braking unit)
- 22 transmission control unit (braking unit)
- 32 electric actuator (braking unit)
- 33 EPB control unit (braking unit)
- 72 shift lever (braking unit)
- 73 start switch (start operation unit)
- 74 display unit
- 75 EPB switch (braking unit)
- 80 Battery

The invention claimed is:

1. A vehicle control system, comprising:
a boost device by which a braking force applied by a foot brake to a vehicle is boosted with an output voltage from a battery,
a parking brake device other than the foot brake, which braking unit brakes the vehicle appropriately and keeps the braking force even in a case that the output voltage is not supplied from the battery, or which braking unit does not require a power supply from the battery for keeping the braking force,
a cell motor which is driven by an output voltage from the battery and starts the engine,
a start operation unit which instructs the cell motor to start, and
a transmission comprising an automatic transmission or a belt-type continuously variable transmission,
wherein the vehicle control system has:
a function to provide an operation facilitation indication for encouraging the driver to set the shift lever of the transmission to a parking range, when the vehicle is moving and the foot brake is in operation,
a function to start the cell motor irrespective of whether the parking brake device is in operation or not, when the start operation unit is operated and the shift lever of the transmission is set to a parking range, and
a function to start the cell motor when the start operation unit is operated, when the shift lever is set to a neutral range and the parking brake device is in operation, on the condition that the vehicle is not moving.

2. The vehicle control system according to claim 1, wherein the vehicle control system starts the cell motor when the start operation unit is operated, irrespective of whether the parking brake device is in operation or not, when the foot brake is not under operation while the vehicle is moving.

* * * * *